H. O. JACKSON.
VEHICLE WHEEL.
APPLICATION FILED JUNE 8, 1908.
920,468.
Patented May 4, 1909.
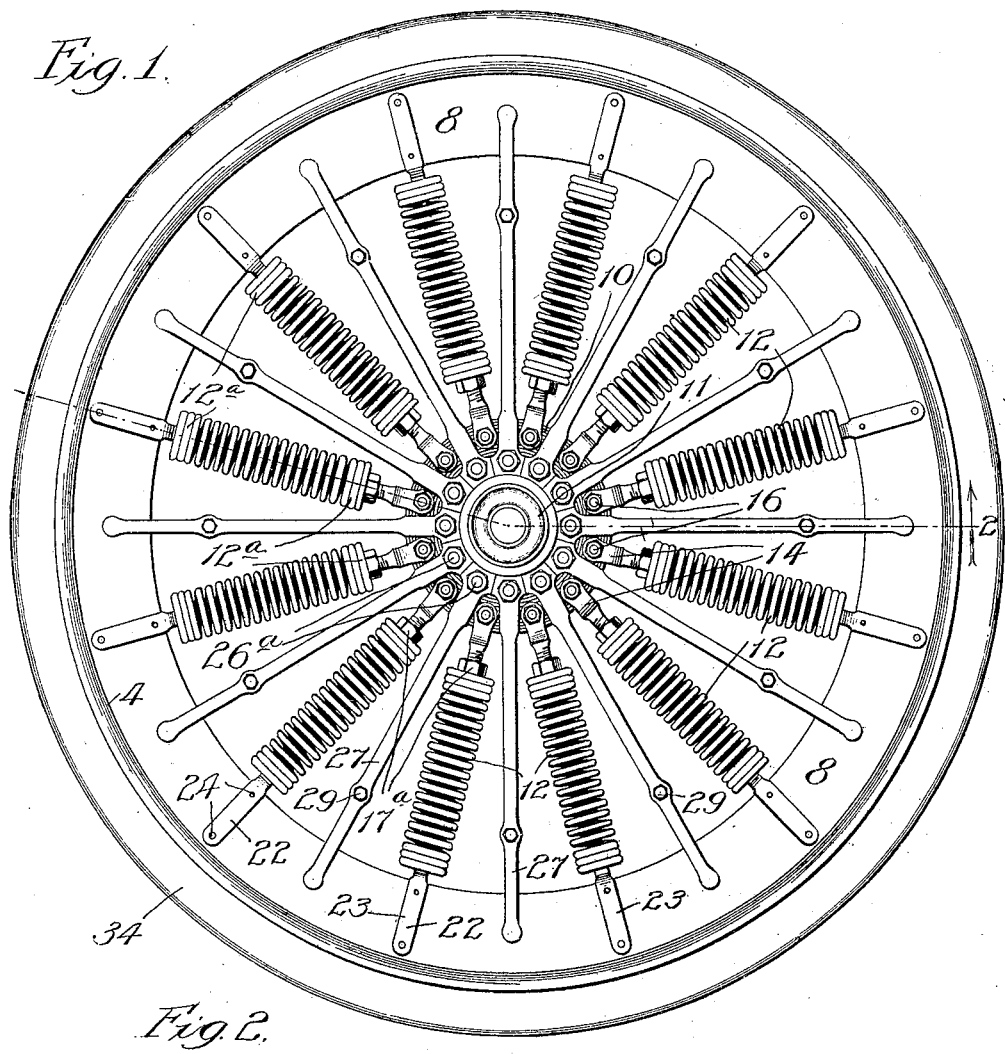
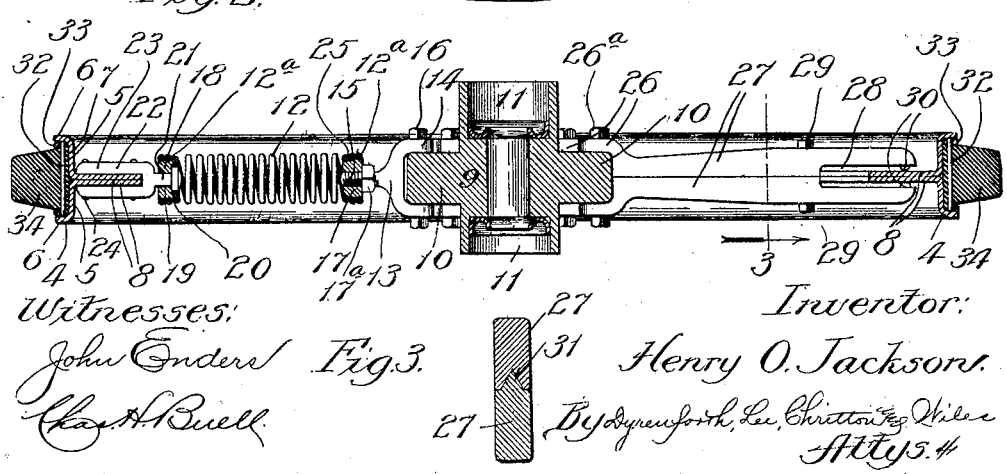
Witnesses:
John Enders
Chas. H. Buell
Inventor:
Henry O. Jackson
By Dyrenforth, Lee, Chritton & Wiles
Attys.

UNITED STATES PATENT OFFICE.

HENRY O. JACKSON, OF CHICAGO, ILLINOIS, ASSIGNOR TO JACKSON WHEEL COMPANY, OF CHICAGO, ILLINOIS, A CORPORATION OF ARIZONA TERRITORY.

VEHICLE-WHEEL.

No. 920,468.     Specification of Letters Patent.     Patented May 4, 1909.

Application filed June 8, 1908. Serial No. 437,260.

*To all whom it may concern:*

Be it known that I, HENRY O. JACKSON, a citizen of the United States, residing at Chicago, in the county of Cook and State of Illinois, have invented a new and useful Improvement in Vehicle-Wheels, of which the following is a specification.

My object is to provide a novel construction of vehicle-wheel of the type employing springs for supporting the rim on the hub, which will be capable, in its use on a vehicle, of absorbing vibrations produced in traveling over rough roads; and in its use in connection with motor-vehicles will serve to relieve strain on the engine in starting and stopping the vehicle.

My invention is illustrated in the accompanying drawings, in which—

Figure 1 is a view in side elevation of a wheel constructed in accordance with my invention. Fig. 2 is a section taken at the line 2 on Fig. 1 and viewed in the direction of the arrow; and Fig. 3, a section taken at the line 3 on Fig. 2 and viewed in the direction of the arrow.

The rim of the wheel which is represented at 4 is formed of two companion sections 5, each of which is constructed, as illustrated, to form a tire-flange 6, a tire-seat 7, and an inwardly extending web 8, these webs fitting flatwise together and forming a rim-flange, and in such condition being held together in a manner hereinafter described.

The hub 9 of the wheel is formed with a circumferential flange 10, beyond which the cone-bearings 11 of the wheel extend. The rim is held to the hub by a series of radially disposed coiled springs 12, each of which is secured to the hub and rim by the following construction. Clips 13, each having a bifurcated end-portion 14 and a radially-extending threaded shank 15, straddle the flange 10 near its peripheral edge, at equal intervals apart, and in this position are pivoted to the flange 10 as by the bolts 16, these shanks having circular heads 17 screwed upon them to which the inner ends of the coiled springs 12 are fastened as hereinafter described, jam-nuts 17ª also screwing upon these shanks for holding the heads 17 in adjusted position. The outer ends of the springs 12 carry heads 18, like the heads 17, excepting that the former instead of containing screw-threaded openings are provided with smooth bores 19 which communicate with sockets 20 on their inner faces. The heads 18 are journaled on the headed shanks 21 of clips 22 which are preferably bifurcated at their outer ends to afford legs 23 which embrace the flange 8 and to which latter they are secured as by the rivets 24. It is desired that the springs 12 be formed with the tightly wound end-portions 12ª and that preliminary to their installation in the wheel they be assembled with the heads 17 and 18 by screwing the latter, which are provided on their peripheries with concave threads 25, into the ends of the springs, the heads being slightly tapered at their inner ends, as shown, to permit them to be readily screwed into the end-portions 12ª which, when the heads are in place, bear with pressure against them and thus bind the heads in position. The hub 9 also carries at both sides of its flange 10 a circular series of closely-abutting plates 26 fastened to the hub as by the bolts 26ª, each of which plates has extending radially from it a bar 27 recessed on its inner surface near its free end, as represented at 28. The bars 27, which are so arranged as to oppose each other, as represented, in which position they are held together by bolts 29 passing transversely through them, fit flatwise against each other and embrace at their outer ends the rim-flange 8 with which they have bearing connection through the medium of balls 30 carried on the inner surfaces of the recessed ends of the rods 27. The opposed abutting surfaces of each pair of rods are preferably tongued and grooved, as represented at 31 in Fig. 3, to maintain the alinement of the rods of each set when the wheel is in use.

The springs 12 are preferably assembled with the other parts of the wheel under relatively high tension, it being preferred that these springs, when assembled, be under an expansion tension of about 750 pounds. The provision of these springs, which serve to afford great resiliency to the wheel, renders it unnecessary that a pneumatic tire be employed, and thus any suitable solid tire may be used. The variety of solid tire illustrated is of a well-known form having transversely-extending rods 32 embedded in its base-portion at which it seats on the portion 7 of the rim, with wire-retaining rings 33 resting against the lateral flanges of the tire 34 and the ends of the rods 32. It will be noted that by placing all the springs under an equal expansion tension, weight upon the hub of the wheel will cause the springs below the hub to be partially compressed and thus tend to place them in normal condition, whereas the springs above the hub will be lengthened and placed under greater tension. By this construction, the springs are caused to absorb all of the ordinary vibration and shock which occurs in traveling over a rough road, preventing such vibrations from being communicated to the vehicle-body, and thus the advantages of pneumatic-tired wheels are afforded.

The feature of pivoting the yokes 14 to the hub enables the latter to have a slight rotary movement relative to the rim of the wheel, and thus in the starting or stopping of the engine for driving the vehicle to which the wheels are attached, the great strain upon it, which occurs in the case where a rigid wheel is employed, is greatly obviated.

The provision of the rim-alining members, of which the bars 27 are a part, serves to maintain the true alinement of the rim on the hub, it being understood that these rim-alining members are rigid with the hub, and when the hub rotates relative to the rim the outer ends of the bars move at their ball-bearings upon the flange 8 of the rim.

It will be noted that each spring is so constructed as to be journaled at one end and screw upon a shank at the other, and thus each of the springs 12 may be adjusted independent of the others when adjustment is desired, the jam-nuts 17$^a$ serving to maintain the heads 17 in adjusted position on the respective shanks.

It is preferred that the heads on the shanks 21 be formed by up-setting the ends of these shanks after they have been inserted into the heads 18.

By constructing a wheel in accordance with my invention, any one of the springs or bar-members 27 amy be easily and quickly removed from its position in the wheel and replaced by another, should impairment occur, without disassembling the other parts of the wheel.

What I claim as new, and desire to secure by Letters Patent, is—

1. A vehicle-wheel comprising, in combination, a hub-portion, a rim, a series of radially-disposed coiled springs connecting the rim to the hub, and a series of radially-disposed rim-alining members secured to the hub, each said member being formed of a pair of separable companion bars secured together and overlapping the rim-portion of the wheel, for the purpose set forth.

2. A vehicle-wheel comprising, in combination, a hub, a rim, a series of radially-disposed coiled springs connecting the rim to the hub, a series of radially-disposed rim-alining members secured to the hub and alternating with the springs, each of said rim-alining members having a bifurcated portion at which it attaches to the hub and a recessed end-portion overlapping the rim of the wheel, said rim-alining members each being divided longitudinally into companion sections, and means for holding the sections together, for the purpose set forth.

3. A vehicle-wheel comprising, in combination, a hub, a rim formed in sections, each provided with an inwardly-extending annular flange, said flanges fitting flatwise together, clips provided with bifurcated portions at which they straddle said flanges, fasteners extending through the bifurcated portions of said clips and through said flanges, a series of radially-extending rim-alining members provided with bifurcations at their opposite ends and divided longitudinally into companion members, said rim-alining members straddling said flanges at their outer bifurcated ends and straddling the hub at their inner bifurcated ends, and means for releasably holding the sections of the rim-alining members in operative position on the hub.

4. A vehicle-wheel comprising, in combination, a hub, a rim, a series of radially-disposed coiled springs connecting the rim to the hub, and a series of radially-disposed rim-alining members secured to the hub, each said member being formed of a pair of separable companion bars releasably secured together and overlapping the rim-portion of the wheel, the mutually abutting surfaces of each pair of the said bars of the rim-alining members having tongue and groove connection with each other, for the purpose set forth.

HENRY O. JACKSON.

In presence of—
RALPH A. SCHAEFER,
A. U. THORIEN.